United States Patent
Yang et al.

(10) Patent No.: US 11,436,874 B2
(45) Date of Patent: Sep. 6, 2022

(54) AUTONOMOUS VEHICLE AND DIAGNOSIS METHOD THEREFOR

(71) Applicants: Hyundai Motor Company, Seoul (KR); Kia Motors Corporation, Seoul (KR)

(72) Inventors: Ju Lee Yang, Seoul (KR); Keun Ryang Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 219 days.

(21) Appl. No.: 16/547,213

(22) Filed: Aug. 21, 2019

(65) Prior Publication Data
US 2020/0320802 A1    Oct. 8, 2020

(30) Foreign Application Priority Data

Apr. 2, 2019   (KR) ........................ 10-2019-0038395

(51) Int. Cl.
*G07C 5/08*      (2006.01)
*B60W 50/02*      (2012.01)
(Continued)

(52) U.S. Cl.
CPC ....... *G07C 5/0808* (2013.01); *B60W 50/0097* (2013.01); *B60W 50/0205* (2013.01);
(Continued)

(58) Field of Classification Search
CPC ........ G07C 5/0808; G07C 5/008; G07C 5/08; G07C 5/02; G07C 5/04; B60W 50/0205; B60W 50/04; B60W 50/0097; B60W 30/14; B60W 2556/45; B60W 2420/52; B60W 2420/54; B60W 2530/14; B60W 2530/18; B60W 2530/20; B60W 2050/0089; B60W 2050/008; B60W 2050/048; B60W 2050/021; B60W 2556/65; B60W 60/0011; B60W 60/0015; B60W 60/0016; B60W 60/0018; B60W 60/00186; B60W 60/00188; B60W 60/0023; B60W 60/0024; B60W 20/50; B60W 2050/022; B60W 50/0225; B60W 50/023; B60W 60/0059; B60W 50/029; B60W 2050/0292;
(Continued)

(56) References Cited

U.S. PATENT DOCUMENTS

| 8,874,305 | B2 | 10/2014 | Dolgov et al. |
| 9,805,522 | B2 | 10/2017 | Schnurr et al. |

(Continued)

FOREIGN PATENT DOCUMENTS

| KR | 20150023532 A | 3/2015 |
| KR | 20180055433 A | 5/2018 |

*Primary Examiner* — Abby Y Lin
*Assistant Examiner* — Esvinder Singh
(74) *Attorney, Agent, or Firm* — Fox Rothschild LLP (57) ABSTRACT

An autonomous vehicle and a diagnosis method for the autonomous vehicle are provided. The autonomous vehicle includes a memory that stores a driving record of the vehicle and a processor that establishes a diagnosis plan. The vehicle diagnosis is performed while operating the vehicle autonomously, when a stopping period of the vehicle is greater than or equal to a predetermined reference period, based on the driving record.

19 Claims, 5 Drawing Sheets

(51) Int. Cl.
*B60W 50/04* (2006.01)
*B60W 50/00* (2006.01)
*G07C 5/00* (2006.01)
*G05D 1/02* (2020.01)

(52) U.S. Cl.
CPC .............. B60W 50/04 (2013.01); G05D 1/02 (2013.01); G07C 5/008 (2013.01); *B60W 2420/52* (2013.01); *B60W 2420/54* (2013.01); *B60W 2556/45* (2020.02)

(58) Field of Classification Search
CPC ............ B60W 2050/0295; G05D 1/02; G05D 1/0214; G05D 1/0225; G05D 1/0287; G06Q 50/30; B60Y 2300/14; B60Y 2306/15; G01M 17/02; B60R 16/0232; H04W 4/46; H04W 4/44; G08G 1/20; G08G 1/22; G05B 2219/31006
See application file for complete search history.

(56) References Cited

U.S. PATENT DOCUMENTS

| | | | |
|---|---|---|---|
| 10,554,521 B1* | 2/2020 | Terechko | H04W 4/026 |
| 2015/0206360 A1 | 7/2015 | Schnurr et al. | |
| 2017/0122841 A1* | 5/2017 | Dudar | B60W 40/02 |
| 2017/0200323 A1* | 7/2017 | Allouche | G07C 5/0808 |
| 2018/0308293 A1* | 10/2018 | DeCia | G07C 5/0808 |
| 2019/0017453 A1* | 1/2019 | Dudar | F02D 41/0037 |
| 2019/0137940 A1* | 5/2019 | Jentz | B60W 50/045 |
| 2019/0227570 A1* | 7/2019 | Miller | G07C 5/0825 |
| 2019/0287317 A1* | 9/2019 | Christen | G01S 7/41 |
| 2020/0042013 A1* | 2/2020 | Kelkar | G05D 1/0287 |
| 2020/0114930 A1* | 4/2020 | Syafril | G07C 5/008 |
| 2020/0310424 A1* | 10/2020 | Schmidt | G05D 1/0088 |
| 2020/0331482 A1* | 10/2020 | Schiemenz | B60W 50/035 |

* cited by examiner

AUTONOMOUS VEHICLE AND DIAGNOSIS METHOD THEREFOR

CROSS-REFERENCE TO RELATED APPLICATION

This application claims the benefit of priority to Korean Patent Application No. 10-2019-0038395, filed on Apr. 2, 2019, the entire contents of which are incorporated herein by reference.

TECHNICAL FIELD

The present disclosure relates to an autonomous vehicle and a diagnosis method for the autonomous vehicle, and more particularly, to an autonomous vehicle that diagnoses states of vehicle parts while in an autonomous driving mode, and a diagnosis method for the autonomous vehicle.

BACKGROUND

An autonomous vehicle controls vehicle behaviors by determining a driving situation and an environment thereof using various types of sensors. The autonomous vehicle diagnoses a vehicle state through self-diagnosis and outputs a warning to a user when there is an error. Furthermore, the autonomous vehicle notifies the user when the vehicle has to be diagnosed and when consumables have to be replaced.

However, the autonomous vehicle may not be driven for a long period of time, which may cause degradation or damage of a part such as battery discharge. Furthermore, the autonomous vehicle is unable to diagnose operational states of driver assistance functions, such as forward collision-avoidance assist (FCA), blind-spot collision warning (BCW), blind-spot collision-avoidance assist (BCA), and the like, by itself and therefore has the inconvenience of requiring a service center for diagnosis.

SUMMARY

The present disclosure provides an autonomous vehicle for diagnosing states of parts while autonomously travelling when the vehicle has not been driven for a long period of time, and a diagnosis method for the autonomous vehicle. Another aspect of the present disclosure provides an autonomous vehicle for diagnosing functions and states thereof in cooperation with other autonomous vehicles while autonomously travelling, and a diagnosis method for the autonomous vehicle. The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an autonomous vehicle may include a memory configured to store a driving record of the vehicle and a processor configured to generate a diagnosis plan and perform vehicle diagnosis while operating the vehicle in an autonomous driving mode, when a stopping period of the vehicle is greater than or equal to a predetermined reference period, based on the driving record. The processor may be configured to perform the vehicle diagnosis, with a part that is likely to be degraded or damaged when the vehicle is not driven for a long period of time, as an object to be diagnosed. The object to be diagnosed may include at least one of a tire pressure, a battery state, an oil state, and a liquid state.

The processor, when establishing the diagnosis plan, may be configured to generate a diagnosis travel course to operate the vehicle to travel more than a minimum distance required for the vehicle diagnosis. The minimum distance may be defined as a minimum travel distance for tire pressure sensing. The processor may also be configured to perform cooperative diagnosis on an object that the vehicle is unable to independently diagnose, in cooperation with at least one diagnosis partner vehicle. The object that the vehicle is unable to independently diagnose may include at least one of a radar sensor, a LiDAR sensor, an ultrasonic sensor, and a communication module.

The autonomous vehicle may further include a communication device configured to communicate with a server, and the processor may be configured to request the server to perform diagnosis partner matching for the cooperative diagnosis. The server may be configured to perform the diagnosis partner matching based on at least one of a distance to empty, a specification of a diagnosis item, a travel schedule, a vehicle size, an inter-vehicle distance, a recent diagnosis state, and a traffic situation. The server may then be configured to transmit a diagnosis partner matching result including diagnosis partner vehicle information, a diagnosis schedule, and a diagnosis plan to the vehicle and the at least one diagnosis partner vehicle.

According to another aspect of the present disclosure, a diagnosis method for an autonomous vehicle may include calculating a stopping period based on a driving record of the vehicle, determining whether the stopping period is greater than or equal to a predetermined reference period, generating a diagnosis plan when the stopping period is greater than or equal to the predetermined reference period, and performing vehicle diagnosis based on the generated diagnosis plan while in an autonomous driving mode.

In the generation of the diagnosis plan, a part that is likely to be degraded or damaged when the vehicle is not driven for a long period of time may be determined to be an object to be diagnosed. The object to be diagnosed may include at least one of a tire pressure, a battery state, an oil state, and a liquid state. In addition, a diagnosis travel course may be generated to operate the vehicle to travel more than a minimum distance required for the vehicle diagnosis. The minimum distance may be defined as a minimum travel distance for tire pressure sensing.

The diagnosis method may further include requesting a cooperative diagnosis service from a server, for an object that the vehicle is unable to independently diagnose, receiving a diagnosis partner matching result from the server in response to the cooperative diagnosis service request, and performing vehicle diagnosis in cooperation with at least one diagnosis partner vehicle included in the diagnosis partner matching result while in autonomous driving mode together with the at least one diagnosis partner vehicle. The object that the vehicle unable to independently diagnose may include at least one of a radar sensor, a LiDAR sensor, an ultrasonic sensor, and a communication module.

The performing of the vehicle diagnosis in cooperation with the at least one diagnosis partner vehicle may include operating the vehicle to autonomously move to a diagnosis location based on a diagnosis schedule, detecting the at least one diagnosis partner vehicle when the vehicle arrives at the diagnosis location, and diagnosing, by the vehicle, a function and a state of the vehicle in cooperation with the at least one diagnosis partner vehicle according to the diagnosis plan.

In the diagnosing of the function and the state of the vehicle, the vehicle may be configured to diagnose the function and the state of the vehicle after changing an arrangement with the at least one diagnosis partner vehicle according to a diagnosis object. In the diagnosing of the function and the state of the vehicle, the vehicle and the at least one diagnosis partner vehicle may alternately diagnose the function and the state of the vehicle. In the performing of the vehicle diagnosis in cooperation with the at least one diagnosis partner vehicle, the vehicle may induce a second vehicle and the at least one diagnosis partner vehicle to depart from a diagnosis area of the vehicle and the at least one diagnosis partner vehicle, when an error situation occurs due to the second vehicle during the vehicle diagnosis.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a method in which two or more autonomous vehicles diagnose vehicle functions while autonomously travelling without intervention by drivers (e.g., in an autonomous driving mode). The present disclosure provides user convenience by performing state diagnosis through autonomous driving and allows two or more vehicles to perform vehicle diagnosis while travelling together to check vehicle functions that a host vehicle has difficulty in diagnosing by independently.

Figure 1:
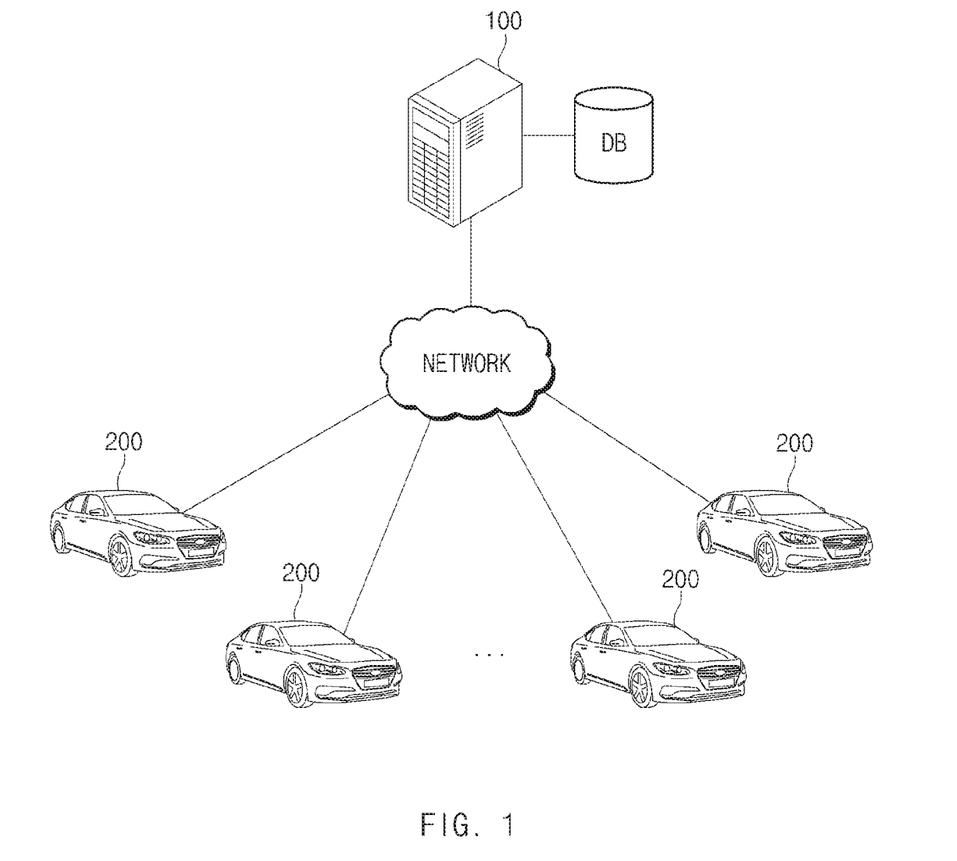
FIG. 1 is a view illustrating a configuration of a diagnosis system for an autonomous vehicle according to an exemplary embodiment of the present disclosure.

FIG. 1 is a view illustrating a configuration of a diagnosis system for an autonomous vehicle according to an exemplary embodiment of the present disclosure. Referring to FIG. 1, the diagnosis system may include a server 100 and a plurality of vehicles 200 capable of autonomous driving, which are connected together via a communication network.

The communication network may be implemented with at least one of a wired internet network, a wireless internet network, a short range communication network, a mobile communication network, and vehicle to everything (V2X).

The wired internet network may be implemented with local area network (LAN), wide area network (WAN), Ethernet, and/or integrated services digital network (ISDN). The wireless internet network may be implemented with wireless LAN (WLAN) (Wi-Fi), wireless broadband (Wibro), and/or world interoperability for microwave access (WIMAX). The short range communication network may be implemented with BLUETOOTH wireless technology, near field communication (NFC), radio frequency identification (RFID), infrared data association (IrDA), and ZIGBEE wireless technology. The mobile communication network may be implemented with code division multiple access (CDMA), global system for mobile communication (GSM), long term evolution (LTE), and international mobile telecommunication (IMT)-2020. The vehicle to everything (V2X) may be implemented with vehicle to vehicle (V2V), vehicle to infrastructure (V2I), vehicle-to-nomadic devices (V2N), and/or in-vehicle network (IVN).

Further, the server 100 supports a cooperative diagnosis service that enables the vehicles 200 to diagnose functions and states thereof in cooperation with each other while performing autonomous driving. The server 100 may include a communication device configured to communicate with the vehicles 200, a processor, and a memory, although not illustrated in FIG. 1. The server 100 may be configured to store and manage information regarding the vehicles 200 that have a subscription to the cooperative diagnosis service, that is, registered vehicle information in a database (DB). The registered vehicle information may include at least one of vehicle identity numbers, vehicle sizes, vehicle specifications, model years, recent diagnosis states, vehicle functions, user identification information, and user preferred items (e.g., a diagnosis time range and a maximum travel distance for diagnosis).

Based on predetermined matching conditions, the server 100 may be configured to match at least two vehicles 200 to perform cooperative diagnosis, as diagnosis partners. In other words, the server 100 may be configured to select vehicles that are to perform vehicle diagnosis together, that is, diagnosis partner vehicles in consideration of information such as an inter-vehicle distance, vehicle specifications, model years, and recent diagnosis states.

The server 100 may be configured to select vehicles 200 that satisfy conditions 1) to 4) among the following matching conditions. The server 100 may then be configured to match two vehicles 200 that are located closest to each other among the selected vehicles 200.

Matching Conditions
1) Distance to empty≥(TPMS minimum travel satisfaction distance+inter-vehicle distance)
2) Specification similarity of diagnosis item
3) Travel schedule: no travel schedule within at least one hour
4) Vehicle size similarity
5) Inter-vehicle distance: vehicles closest to each other among vehicles satisfying conditions 1) to 4)
6) Traffic condition: do not perform diagnosis in case of traffic congestion The server 100 may be configured to generate a diagnosis schedule and a diagnosis plan based on desired diagnosis time, a current position, a distance to empty, and a diagnosis item of each of the vehicles 200 matched as the diagnosis partners. The diagnosis schedule may include a diagnosis date, diagnosis time, and a diagnosis location (a diagnosis start point). The diagnosis location may be determined to be an intermediate point between the vehicles 200 matched as the diagnosis partners. The diagnosis plan may include information such as a diagnosis item, a diagnosis sequence, a travel course for diagnosis (a diagnosis travel course), and a diagnosis method (including a diagnosis condition, a diagnosis check method, and diagnosis time).

The diagnosis item may include various vehicle functions such as forward collision-avoidance assist (FCA), blind-spot collision warning (BCW), blind-spot collision-avoidance assist (BCA), lane keeping assist (LKA), lane departure warning (LDW), rear cross-traffic collision warning (RCCW), rear cross-traffic collision-avoidance assist (RCCA), anti-lock braking system (ABS), advanced smart cruise control (ASCC), and dynamic stability traction control (DSTC) that assist a driver to operate the vehicle, and vehicle components (e.g., parts and consumables) that are listed in Table 1 below.

TABLE 1

| Diagnosis item | | Diagnosis condition | Diagnosis check | Seasonal condition | Note |
|---|---|---|---|---|---|
| oil | engine Oil | need to check before engine start | | | |
| washer fluid | quantity | need to spray | | | |
| wiper | blade wear | | | summer | consumable part |
| heater | heating performance/smell | need to operate | | right before winter | |
| air conditioner | cooling performance/smell | need to operate | | right before summer | |
| tire | air pressure/wear state | need to drive | autonomous driving until TPMS operating condition | | |
| bulb | head lamp/fog lamp/tail lamp | need to turn on | compare normal state photograph by turning on each lamp and capturing image through surround view monitor (SVM) after moving vehicle to dark place (utilize big data) | | consumable part |

TABLE 1-continued

| Diagnosis item | Diagnosis condition | Diagnosis check | Seasonal condition | Note |
|---|---|---|---|---|
| belt | drive belt | | | |
| brake | brake pad | need to operate during travel | operate and replace in case of noise (wear indicator) | replenishment |
| battery | SoC (electrolyte) | need to start | OK when ignition is turned on and notify when ignition is not turned on | |
| coolant | quantity/state/ concentration (anti-freeze:water = 1:1) | need to start | between low and full in a state in which engine is started. | right before summer right before winter | replenishment |

The server 100 may be configured to transmit a diagnosis partner matching result including the diagnosis partner vehicle information, the diagnosis schedule, and the diagnosis plan to each of the vehicles 200 matched as the diagnosis partners. The diagnosis partner vehicle information may include vehicle identification information such as a vehicle identity number and authentication information (e.g., a password). Each of the vehicles 200 may be configured to receive the diagnosis partner matching result transmitted from the server 100. A first vehicle 200 (e.g., a vehicle requiring diagnosis or subject vehicle) may then be configured to be autonomously operated to the diagnosis location by the diagnosis date and time according to the diagnosis schedule included in the diagnosis partner matching result. The first vehicle 200 may be configured to detect a second vehicle matched as the diagnosis partner (e.g., second vehicle or diagnosis partner vehicle), using V2V communication.

In response to detecting the diagnosis partner vehicle, the subject vehicle 200 may be configured to diagnose functions and states thereof in cooperation with the diagnosis partner vehicle while being autonomously driven together with the diagnosis partner vehicle along the predetermined diagnosis travel course according to the diagnosis plan. The subject vehicle 200 and the diagnosis partner vehicle may alternately perform vehicle diagnosis. When performing the vehicle diagnosis, the vehicle 200 may be configured to provide a notification to surrounding vehicles that unmanned vehicle diagnosis is being performed, via V2X communication, thereby preventing unexpected collisions.

Hereinafter, a procedure in which the vehicles 200, for example, a first vehicle and a second vehicle that are matched as the diagnosis partners perform vehicle diagnosis will be described. The first vehicle and the second vehicle may be configured to alternately perform vehicle diagnosis. However, in this exemplary embodiment, for a better understanding of description, it will be exemplified that the first vehicle performs vehicle diagnosis and the second vehicle cooperates with the first vehicle in the vehicle diagnosis of the first vehicle.

The first vehicle may be configured to diagnose functions and states thereof, based on the diagnosis plan in Table 2 below. At this time, the first vehicle and the second vehicle may be configured to detect a battery level immediately after being started.

TABLE 2

| Diagnosis sequence | Diagnosis item | Diagnosis method |
|---|---|---|
| 1 | BCW/BCA | BCW diagnosis - identify side-mirror indicator ON signal of first vehicle when second vehicle enters blind-spot of first vehicle - identify indicator ON signal and warning notification signal when turn signal lamp of first vehicle is turned on<br>BCA diagnosis - identify steering wheel signal in BCW operation situation |
| 2 | LDW/LKA | LDW diagnosis - identify LDW warning lamp pop-up signal in cluster after first vehicle arbitrarily intrudes into lane<br>LAK diagnosis - identify steering wheel signal in LDW operation situation |
| 3 | RCCW/RCCA | RCCW diagnosis - identify RCCW warning notification in audio video navigation (AVN) if second vehicle moves toward first vehicle when first vehicle moves backward after first vehicle and second vehicle are vertically arranged<br>RCCA diagnosis - identify steering wheel signal in RCCW operation situation |
| 4 | FCA | identify FCA warning text and braking signal in first vehicle during hard braking of second vehicle in situation in which first vehicle follows second vehicle |
| 5 | LAMP | when first vehicle sequentially turns on lamps (e.g., headlamp, tail lamp, fog lamp, and turn signal lamp), second vehicle takes photo using camera and identifies normal activation of lamps through big data image analysis |
| 6 | TPMS | identify tire pressure after completion of driving |

Furthermore, when an error situation occurs during the vehicle diagnosis, the first vehicle and the second vehicle may be configured to depart from the error situation. For example, when another vehicle (e.g., a third vehicle) other than the first vehicle and the second vehicle is located in a close position while the first vehicle detects BCW, the first vehicle and the second vehicle may be configured to turn on hazard lights to induce the other vehicle to pass the first vehicle and the second vehicle. When a vehicle (e.g., a fourth vehicle) behind the second vehicle closely approaches the second vehicle within a predetermined distance while the second vehicle detects FCA while following the first vehicle, the second vehicle may be configured to determine whether FCA of the vehicle behind is being operated, via communication with the vehicle behind and request the first vehicle to accelerate to prevent a collision.

Figure 2:
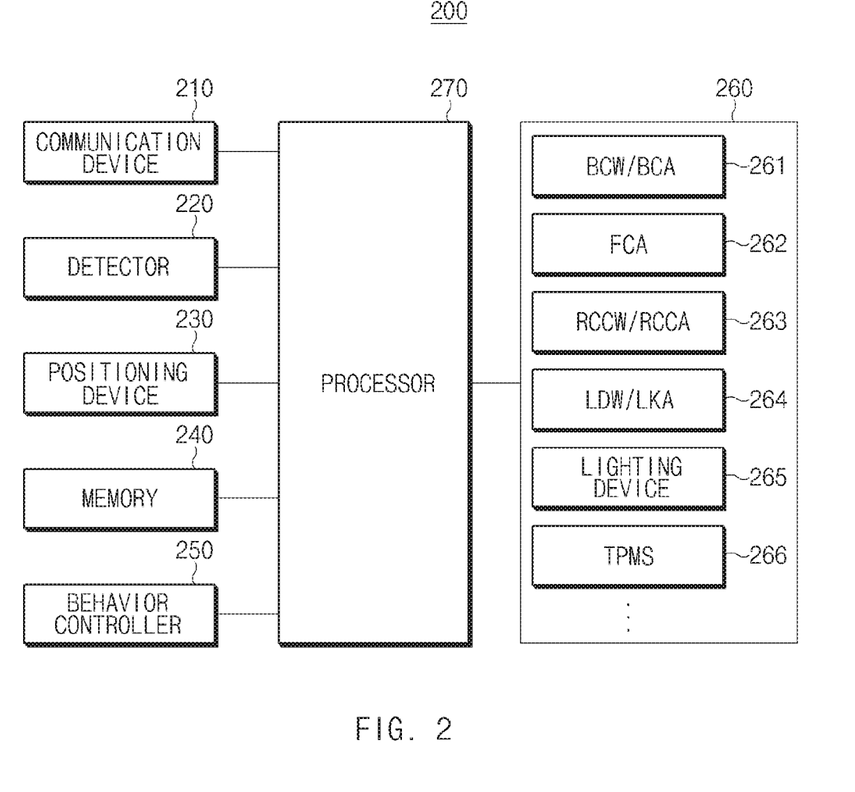
FIG. 2 is a block diagram illustrating an autonomous vehicle according to an exemplary embodiment of the present disclosure.

FIG. 2 is a block diagram illustrating an autonomous vehicle according to an exemplary embodiment of the present disclosure. Referring to FIG. 2, each autonomous vehicle 200 may include a communication device 210, a detector 220, a positioning device 230, a memory 240, a behavior controller 250, a vehicle function controller 260, and a processor 270.

The communication device 210 may be configured to operate the vehicle 200 to perform communication with the server 100 or another vehicle. The communication device 210 may use at least one of vehicle to everything (e.g., V2V and/or IVN), wireless communication technology (e.g., Wi-Fi, BLUETOOTH wireless technology, and/or NFC), and wired communication technology (e.g., Ethernet and/or universal serial bus (USB)). The detector 220 may be configured to detect information regarding surroundings of the vehicle 200 and information regarding the vehicle 200 through sensors mounted within the vehicle 200. The sensors may include a radio detecting and ranging (radar) sensor, a light detection and ranging (LiDAR) sensor, an ultrasonic sensor, an image sensor, a speed sensor, an acceleration sensor, a steering angle sensor, and a shock sensor.

The detector 220 may be configured to obtain vehicle information from an electronic control unit (ECU) such as an air bag system, a vehicle door system, an electronic stability control (ESC), a traction control system (TCS), and/or an antilock brake system (ABS). The positioning device 230 may be configured to measure the current position of the vehicle 200. Particularly, the positioning device 230 may be configured to measure the vehicle position using at least one of positioning technologies such as a global positioning system (GPS), dead reckoning (DR), a differential GPS (DGPS), and a carrier phase differential GPS (CDGPS).

The memory 240 may be configured to store software programmed to cause the processor 270 to perform a predetermined operation. The memory 240 may be implemented with at least one storage medium (recording medium) among storage media such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, and web storage.

The memory 240 may be configured to store map data, a driving history of the vehicle 200, a vehicle size, a vehicle specification, a vehicle identity number, a model year, and a recent diagnosis state. The memory 240 may also be configured to store a diagnosis partner matching result received via the communication device 210. Furthermore, the memory 240 may be configured to store a vehicle diagnosis algorithm, a video analysis algorithm, an autonomous driving algorithm, and a big data analysis algorithm.

The behavior controller 250 may be configured to adjust acceleration/deceleration, braking, gear shift, and/or steering of the vehicle 200 by operating a power source control device (e.g., an engine control device) for operating a power source (e.g., an engine and/or a drive motor) of the vehicle 200, a braking control device, a steering control device, and/or a transmission control device. The engine control device may be configured to adjust a driving torque of the engine based on accelerator pedal position information or a travel speed requested by a high-level controller. The braking control device may be configured to adjust a braking pressure based on a brake pedal position or adjust a braking pressure according to an instruction of the high-level controller.

The steering control device, configured to adjust steering of the vehicle 200, may be implemented with motor drive power steering (MDPS). The transmission control device, which is an actuator for operating a transmission (gear shift) of the vehicle 200, may be implemented with shift by wire (SBW). The transmission control device may be configured to adjust gear shift of the vehicle 200 according to a gear position and a gear state range. The vehicle function controller 260 may be configured to operate the various devices mounted in the vehicle 200, that is, vehicle components. In particular, the vehicle function controller 260 may include a BCW/BCA 261, an FCA 262, an RCCW/RCCA 263, an LDW/LKA 264, a lighting device (a lamp) 265, and a tire pressure monitoring system (TPMS) 266. The vehicle function controller 260 may be configured to execute a specific vehicle function, based on the information regarding the surroundings of the vehicle 200 and the vehicle information that are detected by the detector 220.

The processor 270 may be configured to execute an overall operation of the subject vehicle 200. The processor 270 may be implemented with at least one of an application specific integrated circuit (ASIC), a digital signal processor (DSP), programmable logic devices (PLDs), field programmable gate arrays (FPGAs), a central processing unit (CPU), microcontrollers, and microprocessors. The processor 270 may be configured to store a driving record of the vehicle 200 (e.g., vehicle startup date and time and vehicle shutdown date and time) in the memory 240 by using a clock (not illustrated) or a tachograph (not illustrated). The processor 270 may be configured to calculate a stopping period (non-driving period) of the vehicle 200, based on the driving record.

Additionally, the processor 270 may be configured to determine whether the stopping period is greater than or equal to a predetermined reference period (e.g., about 60 days). The processor 270 may then be configured to generate a diagnosis plan in response to determining that the stopping period is greater than or equal to the predetermined reference period. In other words, the processor 270 may be configured to determine diagnosis objects and a diagnosis travel course in response to determining that the vehicle 200 has not been driven for a long period of time. In particular, parts/objects (e.g., a tire pressure, a battery state, an oil state, and a liquid state) that the vehicle 200 may diagnose independently (alone) and that may be a problem due to the long period of stopping may be selected as the diagnosis items (that is, objects to be diagnosed) by the processor 270. The processor 270 may be configured to determine the diagnosis travel course based on a battery level, map data stored in the memory 240, and traffic information obtained via the communication device 210.

When determining the diagnosis travel course, the processor 270 may be configured to generate the diagnosis travel course to operate the vehicle 200 to travel more than a minimum distance required for diagnosis. Particularly, the minimum distance refers to a travel distance required to sense a tire pressure and/or recharge a discharged battery. The processor 270 may be configured to diagnose vehicle states according to the generated diagnosis plan while operating the vehicle in an autonomous driving mode. In other words, the processor 270 may be configured to transmit a signal to the behavior controller 250 to operate the vehicle 200 in the autonomous driving mode along the diagnosis travel course and diagnose the diagnosis items in a predetermined sequence using the detector 220.

Furthermore, the processor 270 may be configured to perform cooperative diagnosis on diagnosis items (e.g., a RADAR sensor, a LiDAR sensor, an ultrasonic sensor, and/or a communication module) that the vehicle 200 is unable to independently diagnose. The processor 270 may be configured to request a cooperative vehicle diagnosis service from the server 100 via the communication device 210 when generating the diagnosis plan for the diagnosis items that the vehicle 200 may independently diagnose or after independently completing the diagnosis according to the diagnosis plan. Meanwhile, the processor 270 may be configured to request the cooperative vehicle diagnosis service from the server 100 in response to a user request or according to a diagnosis schedule set in advance by a user. The server 100 may then be configured to perform diagnosis partner matching in response to the request of the vehicle 200 and transmit a diagnosis partner matching result.

The processor 270 may then be configured to receive, via the communication device 210, the diagnosis partner matching result transmitted from the server 100. In response, the processor 270 may be configured to operate the vehicle 200 to autonomously travel to a diagnosis location based on a diagnosis schedule included in the diagnosis partner matching result. In particular, the processor 270 may be configured to operate the behavior controller 250 to generate a route with the diagnosis location as a destination and operate the vehicle 200 to autonomously travel along the generated route.

When the vehicle 200 reaches the diagnosis location, the processor 270 may be configured to detect a diagnosis partner vehicle located around or in the vicinity of the vehicle 200, based on the diagnosis partner matching result. The processor 270 may be configured to detect the diagnosis partner vehicle via V2V communication. When the diagnosis partner vehicle is detected, the processor 270 may be configured to operate the vehicle 200 to diagnose functions and states thereof in cooperation with the diagnosis partner vehicle while autonomously travelling with the diagnosis partner vehicle along a predetermined diagnosis travel course according to a diagnosis plan included in the diagnosis partner matching result. The processor 270 may be configured to perform vehicle diagnosis after changing the positions (arrangement) of the vehicle 200 and the diagnosis partner vehicle according to the diagnosis items. The vehicle 200 and the diagnosis partner vehicle may alternately perform the vehicle diagnosis.

When an error situation occurs during the vehicle diagnosis, the processor 270 may be configured to respond thereto by avoiding from the corresponding error situation. In other words, when another vehicle other than the vehicle 200 and the diagnosis partner vehicle is located in a diagnosis area (varying depending on sensing performance of the vehicle 200), the processor 270 may be configured to induce the other vehicle to depart from the diagnosis area. The processor 270 may be configured to provide a notification to the user and/or the server 100 of a diagnosis result when the vehicle diagnosis is completed. In other words, the processor 270 may be configured to transmit the diagnosis result to a user terminal and/or the server 100 via the communication device 210.

Figure 3:
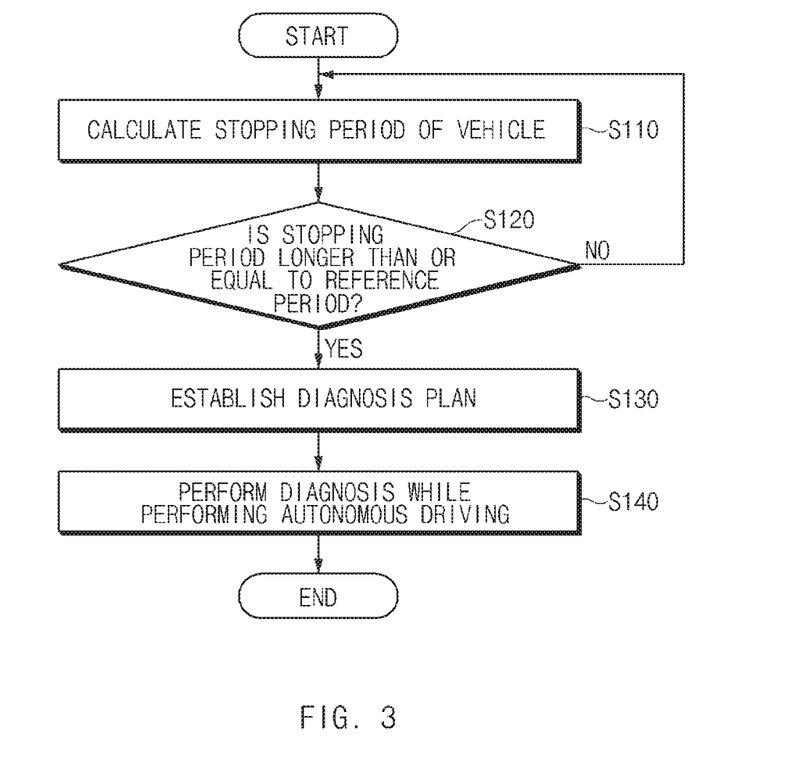
FIG. 3 is a flowchart illustrating a diagnosis method for an autonomous vehicle according to an exemplary embodiment of the present disclosure.

FIG. 3 is a flowchart illustrating a diagnosis method for an autonomous vehicle according to an exemplary embodiment of the present disclosure. Referring to FIG. 3, the processor 270 of the vehicle 200 may be configured to calculate a stopping period of the vehicle 200 (S110). The processor 270 may specifically be configured to calculate the stopping period of the vehicle 200, based on a driving record.

Further, the processor 270 may be configured to determine whether the stopping period is greater than or equal to a predetermined reference period (e.g., two months) (S120). In other words, in response to determining that the stopping period is greater than or equal to the reference period, the processor 270 may be configured to determine that the vehicle 200 has not been driven for a long period of time, and in response to determining that the stopping period is less than the reference period, the processor 270 does not determine that the vehicle 200 has not been driven for a long period of time.

In response to determining that the vehicle 200 has not been driven for a long period of time, the processor 270 may be configured to generate a diagnosis plan (S130). Particularly, the processor 270 may be configured to determine parts that the vehicle 200 is capable of diagnosing independently, as diagnosis items (objects to be diagnosed). For example, the processor 270 may be configured to register a tire pressure, a battery state, an oil state, and a liquid state that may cause malfunction due to the long period of stopping, as the diagnosis items.

Furthermore, the processor 270 may be configured to determine a diagnosis travel course in consideration of a battery level, map data stored in the memory 240, and traffic information obtained via the communication device 210. When determining the diagnosis travel course, the processor 270 may be configured to generate the diagnosis travel course to cause the vehicle 200 to travel more than a minimum distance required for diagnosis. Particularly, the minimum distance refers to a travel distance required to sense a tire pressure and/or recharge a discharged battery.

The processor 270 may then be configured to perform vehicle diagnosis according to the established diagnosis plan while driving in an autonomous driving mode (S140). The processor 270 may be configured to operate the behavior controller 250 (or transmit a control signal thereto) to operate the vehicle 200 to autonomously travel along the diagnosis travel course, and the behavior controller 250 may be configured to adjust the behavior of the vehicle 200 to perform autonomous driving. The processor 270 may then be configured to diagnose the diagnosis items in a predetermined sequence while the vehicle 200 autonomously travels. When performing S130 or after completing the vehicle diagnosis in S140, the processor 270 may be configured to request a cooperative diagnosis service from the server 100 to diagnose a RADAR sensor, a LiDAR sensor, and/or an ADAS sensor that the vehicle 200 is unable to independently diagnose (e.g., unavailable for self-diagnosis).

Figure 4:
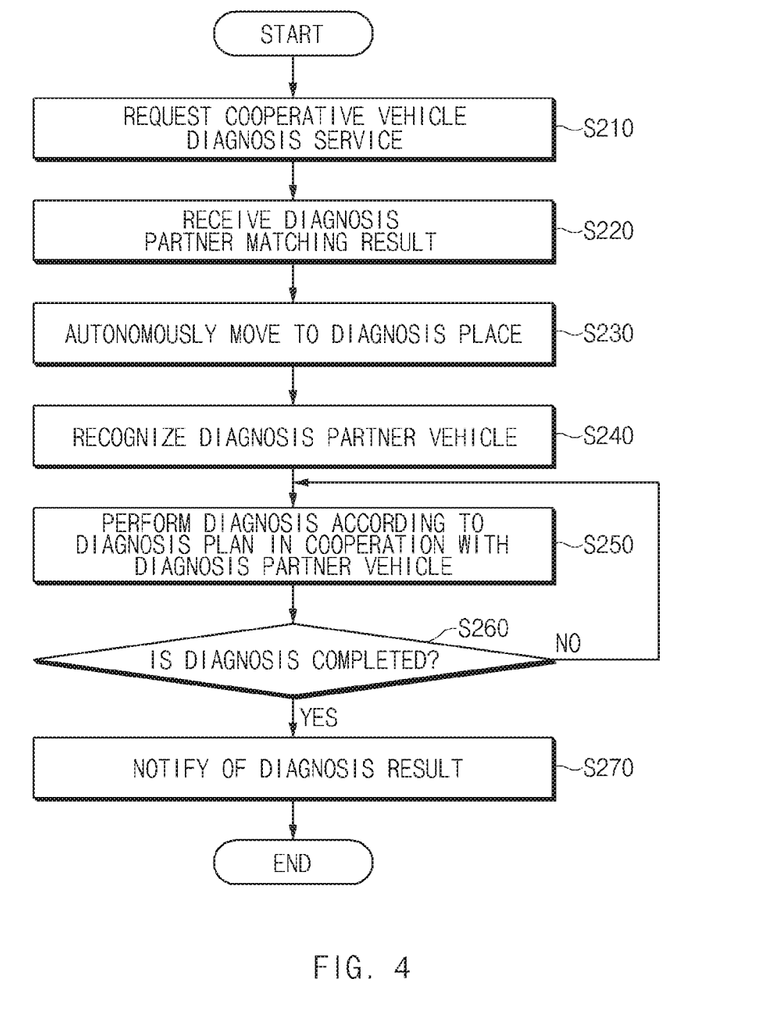
FIG. 4 is a flowchart illustrating a diagnosis method for an autonomous vehicle according to another exemplary embodiment of the present disclosure.

FIG. 4 is a flowchart illustrating a diagnosis method for an autonomous vehicle according to another exemplary embodiment of the present disclosure. In this exemplary embodiment, it will be exemplified that two or more autonomous vehicles perform vehicle diagnosis in cooperation with each other while being driven autonomously. Referring to FIG. 4, the vehicle 200 may be configured to request a cooperative vehicle diagnosis service from the server 100 (S210). In response, the server 100 may be configured to match a diagnosis partner that is to perform cooperative diagnosis, and transmit a diagnosis partner matching result to the vehicle 200 and a diagnosis partner vehicle. The diagnosis partner matching result may include information regarding the diagnosis partner vehicle and information such as a diagnosis schedule and a diagnosis plan.

The vehicle 200 may be configured to receive the diagnosis partner matching result from the server 100 (S220) and drive autonomously to a diagnosis location based on the diagnosis schedule included in the diagnosis partner matching result (S230). In other words, the processor 270 of the vehicle 200 may be configured to transmit a control signal to the behavior controller 250 to operate the vehicle 200 to reach the diagnosis location by diagnosis time on a diagnosis date. The vehicle 200 may be configured to detect the diagnosis partner vehicle when arriving at the diagnosis location (S240).

In particular, the vehicle 200 may be configured to detect, via V2V communication, the diagnosis partner vehicle located around the vehicle 200. For example, the vehicle 200 may be configured to detect a surrounding vehicle as the diagnosis partner vehicle when a vehicle identity number received from the surrounding vehicle corresponds to a vehicle identity number included in the diagnosis partner vehicle information in the diagnosis partner matching result received from the server 100.

The vehicle 200 may be configured to perform diagnosis according to the diagnosis plan in cooperation with the diagnosis partner vehicle (S250). The vehicle 200 may be configured to diagnose functions and states thereof in cooperation with the diagnosis partner vehicle while being driven autonomously together with the diagnosis partner vehicle along a diagnosis travel course. The vehicle 200 and the diagnosis partner vehicle may be configured to alternately perform vehicle diagnosis. The vehicle 200 may be configured to determine whether the vehicle 200 and the diagnosis partner vehicle completely perform the diagnosis, via V2V communication (S260). In other words, the vehicle may be configured to determine when the diagnosis is completed.

Further, the vehicle 200 may be configured to provide a notification to a user and/or the server 100 of a diagnosis result when the diagnosis is complete (S270). In other words, the vehicle 200 may be configured to transmit the diagnosis result to a terminal of an owner of each vehicle and/or the server 100 via the communication device 210. The server 100 may be configured to receive the diagnosis result from the vehicle 200 and the diagnosis partner vehicle and store and manage the received diagnosis result in a DB.

Figure 5:
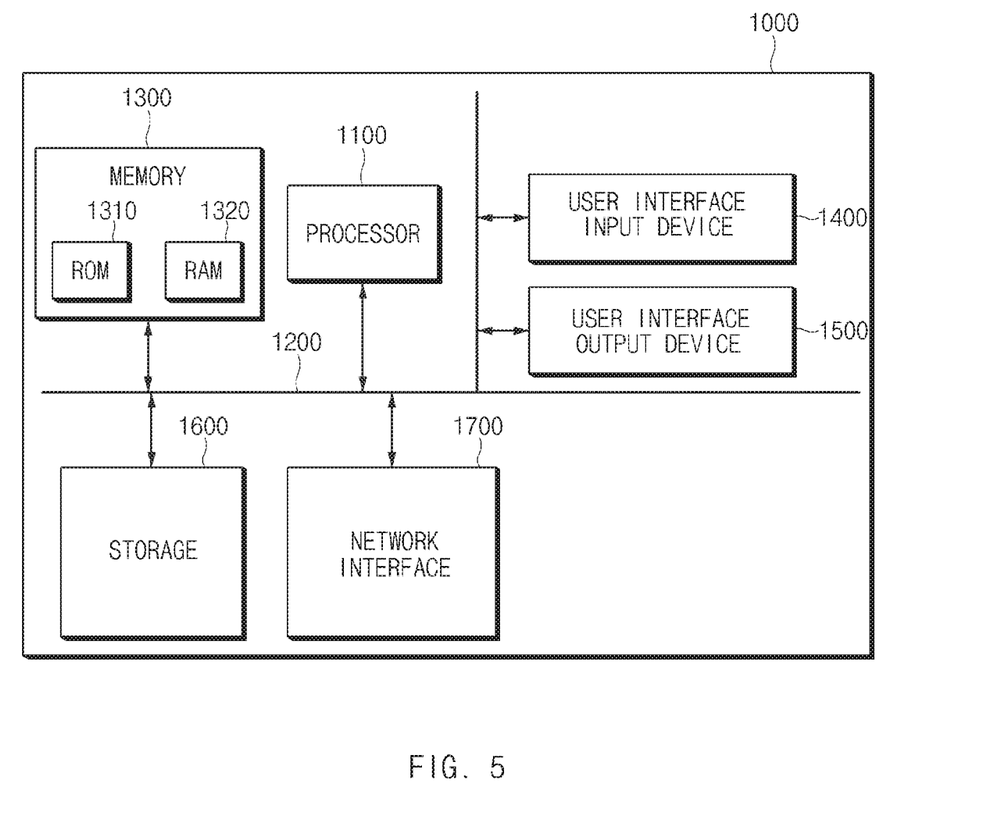
FIG. 5 is a block diagram illustrating a computing system for executing a diagnosis method for an autonomous vehicle according to an exemplary embodiment of the present disclosure.

FIG. 5 is a block diagram illustrating a computing system for executing a diagnosis method for an autonomous vehicle according to an exemplary embodiment of the present disclosure. Referring to FIG. 5, the computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, parts of a vehicle may be prevented from being degraded or damaged when the vehicle has not been driven for a long period of time. In addition, according to the present disclosure, two or more vehicles diagnose functions and states thereof while being driven autonomously together, thereby providing user convenience and enabling diagnosis of vehicle functions that are difficult to check through self-diagnosis.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous vehicle, comprising:
a memory configured to store a driving record of the vehicle; and
a processor configured to:
when a stopping period of the vehicle is greater than or equal to a predetermined reference period, based on the driving record,
determine at least a part that the vehicle is capable of diagnosing independently, as an object to be diagnosed,
determine a diagnosis travel course in consideration of map data stored in the memory and traffic information,
operate the vehicle to drive autonomously along the diagnosis travel course,
diagnose the object to be diagnosed using sensors mounted within the vehicle while operating the vehicle to drive autonomously, and diagnose an object unavailable for self-diagnosis of the vehicle in cooperation with at least one diagnosis partner vehicle while the vehicle is autonomously driven together with the at least one diagnosis partner vehicle along the diagnosis travel course according to a diagnosis plan, wherein the vehicle and the at least one diagnosis partner vehicle alternately performs vehicle diagnosis;

wherein the processor is configured to request a server to perform diagnosis partner matching for the cooperative diagnosis; and wherein the server is configured to perform the diagnosis partner matching in consideration of a distance to empty, a specification of a diagnosis item, a travel schedule, a vehicle size, and an inter-vehicle distance.

2. The autonomous vehicle of claim 1, wherein the processor is configured to diagnose, with a part determined to be degraded or damaged when the vehicle is not driven for a period of time greater than or equal to the reference period, as the object to be diagnosed.

3. The autonomous vehicle of claim 2, wherein the object to be diagnosed includes at least one of a tire pressure, a battery state, an oil state, or a liquid state.

4. The autonomous vehicle of claim 1, wherein the processor is configured to generate the diagnosis travel course to operate the vehicle to travel more than a minimum distance required for vehicle diagnosis.

5. The autonomous vehicle of claim 4, wherein the minimum distance is defined as a minimum travel distance for tire pressure sensing.

6. The autonomous vehicle of claim 1, wherein the object unavailable for self-diagnosis includes at least one of a RADAR sensor, a LiDAR sensor, an ultrasonic sensor, or a communication module.

7. The autonomous vehicle of claim 1, further comprising:
a communication device configured to perform communication with the server.

8. The autonomous vehicle of claim 7, wherein the server is configured to perform the diagnosis partner matching in consideration of at least one of a recent diagnosis state and a traffic situation.

9. The autonomous vehicle of claim 8, wherein the server is configured to transmit a diagnosis partner matching result including diagnosis partner vehicle information, a diagnosis schedule, and a diagnosis plan to the vehicle and the at least one diagnosis partner vehicle.

10. A diagnosis method for an autonomous vehicle, comprising:
calculating, by a processor, a stopping period based on a driving record of the vehicle;
determining, by the processor, whether the stopping period is greater than or equal to a predetermined reference period;
determining, by the processor, at least apart that the vehicle is capable of diagnosing independently, as an object to be diagnosed when the stopping period is greater than or equal to the predetermined reference period;
requesting, by the processor, a server to perform diagnosis partner matching for a cooperative diagnosis;
performing, by the server, the diagnosis partner matching in consideration of a distance to empty, a specification of a diagnosis item, a travel schedule, a vehicle size, and an inter-vehicle distance;

receiving, by the processor, a diagnosis partner matching result including at least one diagnosis partner vehicle from the server;
determining, by the processor, a diagnosis travel course in consideration of map data stored in the memory and traffic information;
operating, by the processor, the vehicle to drive autonomously along the diagnosis travel course;
diagnosing, by the processor, the object to be diagnosed using sensors mounted within the vehicle while operating the vehicle autonomously, and
diagnosing, by the processor, an object unavailable for self-diagnosis of the vehicle in cooperation with the at least one diagnosis partner vehicle while the vehicle is autonomously driven together with the at least one diagnosis partner vehicle along the diagnosis travel course according to a diagnosis plan,
wherein the vehicle and the at least one diagnosis partner vehicle alternately performs vehicle diagnosis.

11. The diagnosis method of claim 10, wherein in determining the object to be diagnosed, a part determined to be degraded or damaged when the vehicle is not driven for a period of time greater than or equal to the reference period is determined to be the object to be diagnosed.

12. The diagnosis method of claim 11, wherein the object to be diagnosed includes at least one of a tire pressure, a battery state, an oil state, or a liquid state.

13. The diagnosis method of claim 11, wherein in determining the diagnosis travel course, the diagnosis travel course is generated to operate the vehicle to travel more than a minimum distance required for vehicle diagnosis.

14. The diagnosis method of claim 13, wherein the minimum distance is defined as a minimum travel distance for tire pressure sensing.

15. The diagnosis method of claim 10, wherein the object unavailable for self-diagnosis includes at least one of a RADAR sensor, a LiDAR sensor, an ultrasonic sensor, or a communication module.

16. The diagnosis method of claim 10, wherein performing the vehicle diagnosis in cooperation with the at least one diagnosis partner vehicle includes: operating, by the processor, the vehicle to autonomously move to a diagnosis location according to a diagnosis schedule; detecting, by the processor, the at least one diagnosis partner vehicle when the vehicle arrives at the diagnosis location; and diagnosing, by the vehicle, a function and a state of the vehicle in cooperation with the at least one diagnosis partner vehicle according to the diagnosis plan.

17. The diagnosis method of claim 16, wherein in diagnosing the function and the state of the vehicle, the vehicle diagnoses the function and the state of the vehicle after changing an arrangement with the at least one diagnosis partner vehicle according to a diagnosis item.

18. The diagnosis method of claim 16, wherein in diagnosing the function and the state of the vehicle, the vehicle and the at least one diagnosis partner vehicle alternately diagnose the function and the state of the vehicle.

19. The diagnosis method of claim 10, wherein in performing the vehicle diagnosis in cooperation with the at least one diagnosis partner vehicle, the vehicle induces a third vehicle to depart from a diagnosis area, when an error situation occurs due to the third vehicle during the vehicle diagnosis.

* * * * *